United States Patent
Pedersen et al.

(10) Patent No.: US 7,480,278 B2
(45) Date of Patent: Jan. 20, 2009

(54) ADMISSION CONTROL WITH DIRECTIONAL ANTENNA

(75) Inventors: Klaus Ingemann Pedersen, Aalborg (DK); Preben Elgaard Mogensen, Gistrup (DK); Juan Ramiro Moreno, Málaga (ES)

(73) Assignee: Nokia Corporation, Espoo (FI)

( * ) Notice: Subject to any disclaimer, the term of this patent is extended or adjusted under 35 U.S.C. 154(b) by 682 days.

(21) Appl. No.: 10/476,666

(22) PCT Filed: May 4, 2001

(86) PCT No.: PCT/EP01/05059

§ 371 (c)(1),
(2), (4) Date: Nov. 4, 2003

(87) PCT Pub. No.: WO02/091779

PCT Pub. Date: Nov. 14, 2002

(65) Prior Publication Data

US 2004/0136342 A1 Jul. 15, 2004

(51) Int. Cl.
*H04B 7/216* (2006.01)

(52) U.S. Cl. .............. 370/335; 370/342; 370/336; 370/343; 370/337; 370/235; 455/405; 455/456.1; 455/404.2; 455/67.15

(58) Field of Classification Search ......... 370/329, 370/252, 335, 342, 336, 343, 337, 235; 455/509, 455/67.15, 67.16, 67.13, 404.2, 405, 456.1, 455/434
See application file for complete search history.

(56) References Cited

U.S. PATENT DOCUMENTS

| | | | | |
|---|---|---|---|---|
| 5,886,988 A * | 3/1999 | Yun et al. | .................... | 370/329 |
| 6,314,293 B1 * | 11/2001 | Servi et al. | ................... | 455/450 |
| 6,934,555 B2 * | 8/2005 | Silva et al. | ..................... | 455/522 |
| 6,975,609 B1 * | 12/2005 | Khaleghi et al. | ............ | 370/335 |
| 7,173,904 B1 * | 2/2007 | Kim | ........................... | 455/522 |

OTHER PUBLICATIONS

"Directional Power Admission Control for WCDMA Systems Using Antenna Arrays", Center for Personkommunikation, Apr. 18, 2001, XP002188372, retrieved from the Internet: http://cpk.auc.dk.
"Call Admission Control Algorithm for CDMA Systems with Adaptive Antennas", Y. Hara, VTC 2000—Fall IEEE VTS 52nd Vehicular Technology Conference, Sep. 24-28, 2000, vol. 5 of 6, Conf. 52, Sep. 24, 2000, pp. 2518-2522, XP000988454.
"Uplink Admission Control and Soft Capacity with MUD in CDMA", Holma et al, Vehicular Technology Conference, 1999, IEEE VTS 50th Amsterdam, Netherlands, Sep. 19-22, 1999, pp. 431-435, XP010352848.

* cited by examiner

*Primary Examiner*—Vincent P. Harper
*Assistant Examiner*—Fred A Casca
(74) *Attorney, Agent, or Firm*—Squire, Sanders & Dempsey, LLP

(57) ABSTRACT

An apparatus and method for performing an admission control of a terminal device with an antenna array in a cellular network is provided. The admission control decision is based on a direction-specific load determined by an estimation of a load-dependent directional parameter. Additionally, a cell-splitting function with at least two scrambling codes can be implemented.

33 Claims, 6 Drawing Sheets

ADMISSION CONTROL WITH DIRECTIONAL ANTENNA

FIELD OF THE INVENTION

The present invention relates to a method and system for performing an admission control with a directional antenna such as an antenna array in a cellular network such as a WCDMA (Wideband Code Divisional Multiple Access) network.

BACKGROUND OF THE INVENTION

It is known from Z. Liu, M. Zarki, "SIR Based Call Admission Control for DS-CDMA Cellular Systems", *IEEE Journal on Selected Areas in Communications*, Vol. 12, No. 4, pp. 638-644, May 1994, from Z. Dziong, M. Jia, P. Mermelstein, "Adaptive Traffic Admission for Integrated Services in CDMA Wireless Access Networks", *IEEE Journal on Selected Areas in Communications*, Vol. 14, No. 9, pp. 1737-1747, December 1996, and from S. Kumar, S. Nanda, "High Data-Rate Packet Communications for Cellular Networks Using CDMA: Algorithms and Performance", *IEEE Journal on Selected Areas in Communications*, Vol 17, No. 3, pp. 474-492, March 1999, that power is a robust integral measure of the network load for WCDMA systems, supporting both speech and variable bit-rate data users. Hence, users are allowed to access the system provided that $P<P_{threshold}$, where $P_{threshold}$ is a known power threshold obtained from network dimensioning, and P is the total transmit power from the respective Base Station (BS). Assuming that the power allocated to user number n equals $P_n$, then the following relation can be expressed: $P=\Sigma P_n$.

In order to quantify if the same decision rule can be applied for BSs equipped with antenna arrays, the expected capacity gain from using this technology has to be considered. It is assumed that simple beamforming (BF) is used with an M-element antenna array, where a beam is created towards the desired user without considering the signals from interfering users (i.e. knowledge of the spatial covariance interference matrix is not exploited). Provided that the interference is spatially white (i.e. interference is not dependent on the spatial transmitting or receiving direction of the beam), the capacity can approximately be improved with a factor of M (assuming omni antenna elements), while no capacity gain is expected for the case where all users are positioned at the same azimuth direction. Thus, the capacity gain due to spatial filtering is very sensitive to the spatial distribution of interference, and consequently it is important that this mechanism is captured by the admission control (AC) algorithm, so that the system remains stable under all possible conditions. This is especially important for systems with mixed speech and high bit-rate data services, where the spatial interference is likely to deviate from the spatial white assumption, which normally is assumed valid for WCDMA systems supporting a large number of speech users only.

SUMMARY OF THE INVENTION

It is an object of the invention to provide a method and network element for performing an admission control with an antenna array, by means of which system stability can be guaranteed.

This object is achieved by a method for performing an admission control in a cellular network, said method comprising the steps of:

determining a location of a terminal device to be admitted;
estimating a load-dependent directional transmission parameter of a directional antenna, which results fromf an admission of said terminal device; and
admitting said terminal device if said directional transmission parameter does not exceed a predetermined threshold in any available direction of said directional antenna.

Furthermore, the above object is achieved by a network system for performing an admission control in a cellular network, said system comprising:

a directional antenna;
estimation means for estimating a load-dependent directional transmission parameter of said directional antenna, which results from an admission of a terminal device; and
control means for admitting said terminal device if said estimated directional transmission parameter does not exceed a predetermined threshold in any available direction of said directional antenna.

According to the present invention, the currently used AC algorithms can be extended to support BS's equipped with antenna arrays, so that the full capacity gain is obtained in the network. In particular, a reliable admission control can be provided for admitting a terminal device, i.e. user, since the directional transmission parameter is checked in all available directions to make sure that the threshold for admission is not exceeded in another direction due to beam coupling effects.

Preferably, the directional transmission parameter may be a directional transmission power determined by calculating a transmission power azimuth spectrum using a beam pattern of the directional antenna, which may be an antenna array, a smart antenna or any other type of directional antenna. Additionally, an azimuth dispersion in the radio channel may be used for calculating the transmission power azimuth spectrum. In particular, the transmission power azimuth spectrum may be calculated by adding a directional power increase, caused by said admission, to a transmission power azimuth spectrum obtained before said admission.

As an alternative, the directional transmission parameter may be a directional throughput. In this case, a user is admitted if the total cell throughput in each available direction is below a certain predefined throughput threshold.

In a continuous beamforming antenna system, a steering direction of a beam used for transmission to the terminal device may be selected to cover to said determined location. Then, an increase of the directional transmission parameter is estimated for all azimuth directions. The estimated parameter increase may be used to estimate a new azimuth spectrum of the directional parameter based on a supplied user-specific information which may comprise at least one of a ratio of bit energy to noise spectral density, a bitrate, a pilot measurement, and a direction of access estimate.

As an alternative, an antenna system with a finite set of beams may be used. In this case, a beam of the finite set of beams may be selected for transmission to said terminal device based on the determined direction. Then, an increase of the directional transmission parameter may be estimated for the directions of the finite set of beams based on a coupling matrix defining coupling coefficients between the finite set of beams. In particular, a digital beamformer network may be used in the estimation step to derive an estimation of new power levels for each beam of the finite set of beams. The coupling matrix may be updated based on measurements and/or estimates of an uplink spatial covariance matrix. Furthermore, the coupling matrix may be pre-computed using a fixed azimuth spread of the finite set of beams. As in the continuous beamforming antenna system, the estimated power increase may be used to estimate a new power azimuth spectrum based on a supplied user-specific information. Here, the user-specific information may comprises at least one of a ratio of bit energy to noise spectral density, a bitrate, a pilot measurement, and a selected beam for the new terminal device.

The directional antenna may be a dual polarized antenna array. In this case, the finite set of beams may be provided for each polarization, and the estimation of the directional transmission parameter may be performed by adding parameter estimations for each polarization.

Furthermore, primary and secondary scrambling codes may be allocated to different beams of the finite set of beams. In this case, the primary scrambling code may be allocated to a first subset of beams, and the secondary scrambling code may be allocated to a second subset of beams. Specifically, the first subset and the second subset may comprise four adjacent beams. In an alternative configuration, the first subset may comprise five adjacent beams and the second subset may comprise three adjacent beams. Initially, the primary scrambling code can be allocated to all beams of the finite set of beams, and then the secondary scrambling code can be allocated when the code load has exceeded a predetermined threshold. Moreover, an adaptive code allocation scheme can be used, wherein the allocation of the second scrambling code is started at a first code trigger and stopped at a second code trigger which corresponds to a larger code load.

In general, a margin may be provided as a protection for parameter increase estimation errors. Thereby, reliability of the admission control can be increased.

One or both of the estimation means and the control means may be arranged in a base station or a radio network controller of the cellular network.

BRIEF DESCRIPTION OF THE DRAWINGS

In the following, the present invention will be described in greater detail based on preferred embodiments with reference to the accompanying drawing figures in which.

DESCRIPTION OF THE PREFERRED EMBODIMENTS

Figure 1:
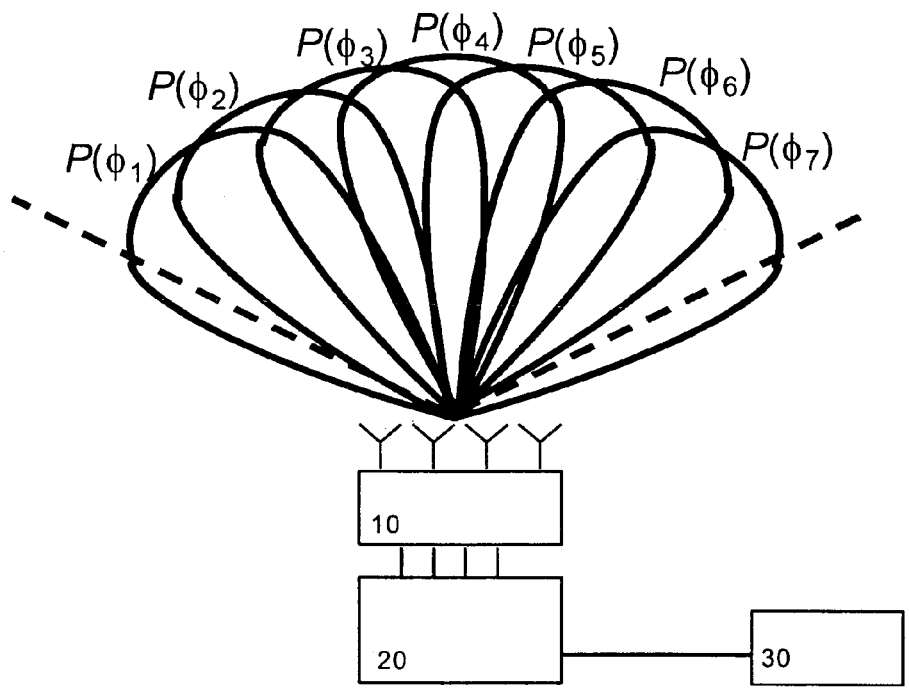
FIG. 1 shows a schematic block diagram of a WCDMA network, indicating spatial beams of an antenna array.

The preferred embodiments will now be described on the basis of an admission control scheme for a WCDMA base station 20 using an antenna array or smart antenna (SA) 10 with a conventional beamforming algorithm, as shown in FIG. 1.

According to FIG. 1, a cellular WCDMA network comprises a radio network controller (RNC) 30 to which the base station (BS) 20 with the SA 10 is connected. In this example, a directional power based admission control (AC) algorithm is applied in the BS 20 using the SA 10. Thus, the directional transmission power is selected as the directional transmission parameter. The admission control functions may be implemented as well in the RNC. In principle, the AC functionality could be placed at any location (network element), provided that the required input parameters are available.

Furthermore, the effective transmission or reception power azimuth spectrum of the BS 20 with the SA 10 and conventional beamforming (beam-steering) is illustrated with seven beams directed to azimuth directions $\phi_1$ to $\phi 7$. The basic idea is to admit users if $P(\phi)<P_{threshold}$ for all $\phi$, where $P(\phi)$ is the normalized integral transmit power azimuth spectrum including the antenna array beam pattern and the azimuth dispersion in the radio channel. Hence, in order to determine if a new user can be granted capacity an estimate of $P(\phi)=P_{old}(\phi)+\Delta P(\phi)$ is required, where $P_{old}(\phi)$ is the power spectrum before admission of the user, and $\Delta P(\phi)$ is the power increase caused by admission of the user.

It is assumed that the maximum transmitted power in a certain azimuth direction is denoted $\text{Max}\{P(\phi)\}$. It can then easily be shown that $\text{Max}\{P(\phi)\}=\Sigma P_n$ if all users are located at the same azimuth, while $\text{Max}\{P(\phi)\}\approx(1/M)\Sigma P_n$ if the interference is spatially white. Consequently, the proposed AC algorithm will automatically allow a factor of M additional users in the system, when the interference is spatially white compared to the case with directional interference.

In the following, the proposed AC for the BS 20 with the SA 10 will be described.

The description of the preferred embodiments is focused on the downlink (DL) direction AC (i.e. BS 20 to mobile terminal) for WCDMA systems using smart antennas (SA) with conventional beamforming (BF). The proposed AC algorithm for SA applied in the uplink (UL) is based on the same principle as the one derived for DL. In the following, the basic approach to this problem is shortly outlined for both UL and DL.

An expression for the effective transmitted power azimuth spectrum caused by one user can be derived as follows, assuming that a beam is steered in the azimuthal direction $\phi_1$ and the transmitted power equals P. The transmitted complex baseband signal at the antenna array is expressed as $$s(t) = \sqrt{P}\, u(t) \frac{1}{\sqrt{M}} c(\phi_1), \quad (1)$$

where the vector $s(t)=[s_1(t), s_2(t), \ldots, s_M(t)]^T$ contains the signals transmitted on the M-antennas. The complex baseband signal $u(t)$ is assumed to have zero mean and unit power. The array steering vector is expressed as $$c(\phi)=[c_1(\phi), c_2(\phi), \ldots, c_M(\phi)]^T \quad (2)$$

where $c_m(\phi)=\exp(-j(m-1)\pi \sin\phi)$, assuming a uniform linear antenna array with an element spacing of half wavelength.

The mathematical notation $[\ ]^T$ denotes transposition. The received signal at a mobile terminal or user equipment (UE) positioned in the azimuthal direction $\phi_2$ is a sum of signals received via a number of multipaths in the radio channel. According to K. I. Pedersen, P. E. Mogensen, B. Fleury, "A Stochastic Model of the Temporal and Azimuthal Dispersion Seen at the Base Station in Outdoor Propagation Environments", IEEE Trans. on Vehicular Technology, Vol. 49, No. 2, pp 437-447, March 2000, the radio channels narrowband propagation vector connecting a UE located at $\phi_2$ and the M antenna elements at the BS 20 can be expressed as $$h(\phi_2) = \Sigma \alpha_l c(\theta_l - \phi_2), \qquad (3)$$

where $\alpha_l$ is the complex amplitude of the different multipaths in the channel, and $\theta_l$ is the corresponding azimuthal direction (at the BS 20). It is noted, that the equation (3) indicates a stochastic process, where the azimuths $\theta_l$ are approximated as identical independent zero mean Gaussian distributed for typical urban environments. It is furthermore assumed that the propagation vector in equation (3) is normalized so that the expectation of the power of the components in the vector equals unity, i.e. the pathloss towards the UE is not included in the propagation vector.

The signal received at a UE located at $\phi_2$ is thus expressed as $$y(t) = h^H(\phi_2)s(t), \qquad (4)$$

where $[\ ]^H$ denotes Hermitian transposition. The received power versus the UE's azimuth position is subsequently obtained as $$\begin{aligned} P(\phi_2) &= E\{|y(t)|^2\} \\ &= E\{|h^H(\phi_2)s(t)|^2\} \\ &= Pc^H(\phi_1)R(\phi_2)c(\phi_1) \\ &= PW(\phi_1;\phi_2) \end{aligned} \qquad (5)$$

Here the radio channels spatial covariance matrix is expressed as $$\begin{aligned} R(\phi_2) &= E\{h(\phi_2)h^H(\phi_2)\} \\ &= \frac{1}{M}\oint c(\phi)c^H(\phi)p_A(\phi-\phi_2)d\phi \end{aligned} \qquad (6)$$

where $p_A(\phi)$ is the radio channels power azimuth spectrum, which can be approximated with a zero mean Laplacian function, as described in K. I. Pedersen, P. E. Mogensen, B. Fleury, "Power Azimuth Spectrum in Outdoor Environments", IEE Electronics Letters, Vol. 33, pp. 1583-1584, August 1997, i.e.

$$p_A(\phi) = \frac{1}{\sigma_A\sqrt{2}}\exp[-\sqrt{2}|\phi|/\sigma_A], \qquad (7)$$

where $\sigma_A$ is the radio channels azimuth spread (AS), which typical is on the order of 5-10 degrees in average for typical urban environments. The function $W(\phi_1;\phi_2)=c^H(\phi_1)R(\phi_2)c(\phi_1)$ can be interpreted as follows: It expresses the normalized effective antenna array gain in the direction $\phi_2$ when pointing a beam in the direction $\phi_1$. It is noted that this function captures the effect of azimuth dispersion in the radio channel as well as variations of the antenna array beamwidth and side-lobe level as function of the number of elements M. Furthermore, it is noted that due to the normalizations applied here, it can easily be shown that $0 \leq W(\phi_1;\phi_2) \leq 1$ and $W(\phi_1;\phi_2)=1$ for $\phi_1=\phi_2$. Furthermore $W(\phi_1;\phi_2)=1$ for M=1 for all values of $\{\phi_1;\phi_2\}$.

The first preferred embodiment will now be described as an example for continuous beamforming which is a mode where individual beams are used for all users. This means that the steering direction of the beam for a certain user corresponds to the azimuthal direction towards the user. It is noted that transmission towards the user is done using only one steered beam. In some bad urban environments, transmission via two or more beams might be applicable, provided that two or more main propagations exist between the BS 20 and the UE with different incident angles at the BS antenna array 10. The steering direction towards the UE (also known as direction-of-arrival, DoA) is estimated from the uplink received signal from the UE. Assuming N users, where user n is located at the azimuth $\phi_n$ and transmitting with power $P_n$, we can express the effective power azimuth spectrum as $$P(\phi) = \sum_{n=1}^{N} P_n W(\phi_n;\phi) + P_{pilot}, \qquad (8)$$

where $P_{pilot}$ is the power allocated to the primary common pilot (CPICH), which is transmitted on a sector beam and therefore not weighted with the function $W(\phi_1;\phi_2)$. Other common channels that are transmitted on the sector beam like the CCPCH etc. should be treated similarly as the CPICH and not being weighted by the function $W(\phi_1;\phi_2)$. This implies that the UE can no longer use the CPICH for phase reference, only the dedicated pilot symbols are applicable. This does in general lead to a loss in performance on the order of 1-2 dB due to less accurate channel and SIR estimates. Based on equation (8), the system is considered stable and not in overload provided that $$P(\phi) < P_{threshold}. \qquad (9)$$

where $P_{threshold}$ is the power level which defines overload. It is noted that for M=1 the criterion in equation (9) reduces to $$\sum_{n=1}^{N} P_n + P_{pilot} < P_{threshold}, \qquad (10)$$

Prior to admission of a new user on to the BS 20 with the SA 10, the power increase for all azimuths is estimated and it is then verified that equation (9) is true before the new user is granted capacity.

Figure 2:
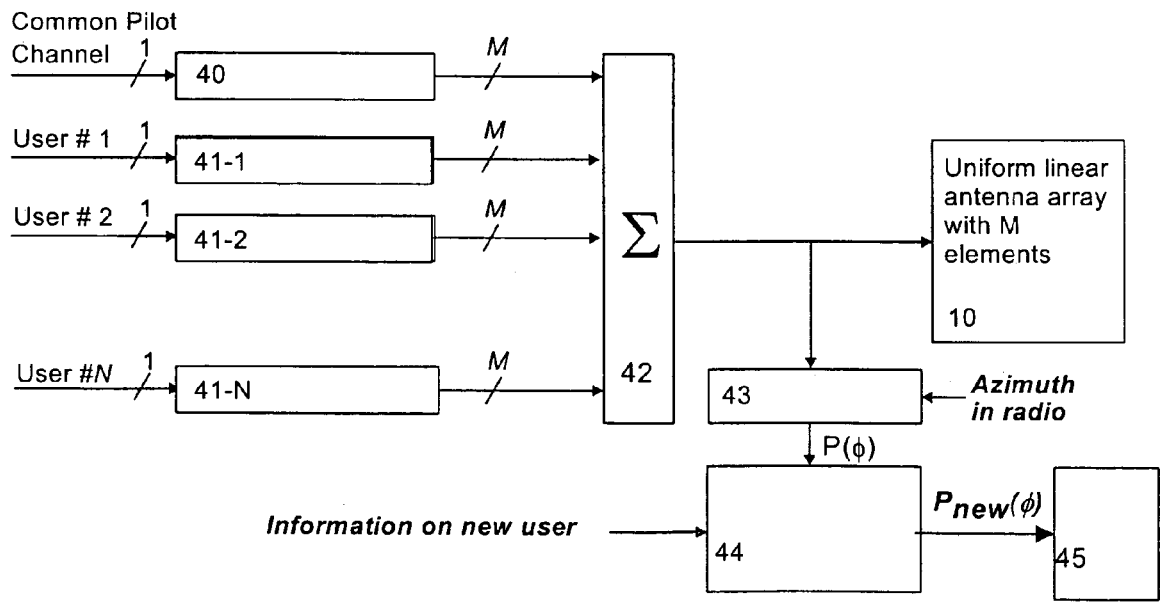
FIG. 2 shows a schematic block diagram of a base station architecture according to a first preferred embodiment.

FIG. 2 shows a schematic block diagram of the AC architecture according to the first preferred embodiment. According to FIG. 2, a sector beamformer unit 40 is provided for supplying M sector beamforming signals to a combining (e.g. summing) network 42, where the M sector beamforming signals are combined with user-specific beamforming signals and supplied to the SA 10, e.g. a uniform linear antenna array with M elements. The sector beamforming signals are generated on the basis of a common pilot channel signaling defining the desired sector to be served by the BS 20. The user-specific beamforming signals are generated in respective beamformer units 41-1 to 41-N to obtain beam directions based on respective user signals User#1 to User#N. An effective power azimuth spectrum $P(\phi)$ is measured in a corresponding measurement unit 43 by using the output signal of the combining network 42, prior to admission of the new user, and supplied to an estimation unit 44 for estimating the new power azimuth spectrum $P_{new}(\phi)$ based on supplied user-specific information about the new user. The new power azimuth spectrum $P_{new}(\phi)$ is then supplied to an AC functionality 45. The user information may comprise at least one of a required Eb/No (ratio of bit energy to noise spectral density), bitrate, pilot measurement, and DoA estimate. It is noted that it is not sufficient to estimate the directional power increase at the azimuth angle corresponding to the new user, since the global maximum of $P(\phi)$ after admission might be located at an arbitrary azimuth. Directional power increase estimators are derived and discussed later.

Figure 3:
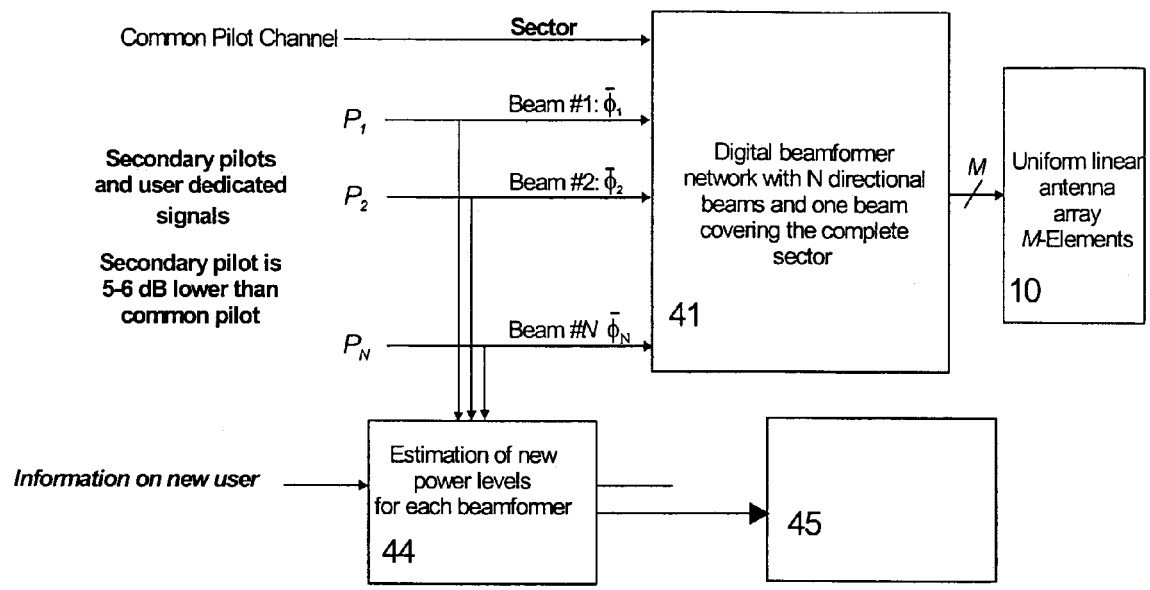
FIG. 3 shows a schematic block diagram of a base station architecture according to a second preferred embodiment.

FIG. 3 shows a schematic block diagram of an AC architecture according to the second preferred embodiment, where an alternative to continuous BF is used, namely a grid of fixed beams. In this case, only a finite set of N directional beams is used, with azimuthal steering directions $$[\bar{\phi}_1, \bar{\phi}_2, \ldots, \bar{\phi}_N]. \tag{11}$$

Using this approach, a secondary common pilot channel (S-CPICH) can be allocated to each beam, which the UE can use for channel estimation (phase reference). The channel estimate obtained from the S-CPICH is significantly better than the estimate obtained from the dedicated pilot symbols, which in general results in the conclusion that a grid of fixed beams is more attractive for the DL. Secondly, also the accuracy of the SIR estimate used in the closed loop power control algorithm is improved when introducing S-CPICH. However, the improved channel and SIR estimate is obtained by introducing an additional overhead (S-CPICH) which eats of the total capacity pool. The power allocated to beam number n may thus be expressed as $$\bar{P}_n = P_n^{SCPICH} + P_n^{user}, \tag{12}$$

where $P_n^{SCPICH}$ is the power of the S-CPICH allocated to beam n and $p_n^{user}$ is the sum of powers of the users allocated to beam n. From equations (8) and (11), the effective transmitted power azimuth spectrum corresponding to the N steering directions can be obtained via a simple linear transformation as $$\begin{bmatrix} P(\bar{\phi}_1) \\ P(\bar{\phi}_2) \\ \vdots \\ P(\bar{\phi}_N) \end{bmatrix} = \begin{bmatrix} W(\bar{\phi}_1; \bar{\phi}_1) & W(\bar{\phi}_1; \bar{\phi}_2) & \cdots & W(\bar{\phi}_1; \bar{\phi}_N) \\ W(\bar{\phi}_2; \bar{\phi}_1) & W(\bar{\phi}_2; \bar{\phi}_2) & & W(\bar{\phi}_2; \bar{\phi}_N) \\ \vdots & & \ddots & \vdots \\ W(\bar{\phi}_N; \bar{\phi}_1) & W(\bar{\phi}_N; \bar{\phi}_2) & \cdots & W(\bar{\phi}_N; \bar{\phi}_N) \end{bmatrix} \begin{bmatrix} \bar{P}_1 \\ \bar{P}_2 \\ \vdots \\ \bar{P}_N \end{bmatrix} + P_{pilot}. \tag{13}$$

The N×N matrix in equation (13) can be interpreted as a coupling matrix between the N directional beams. For the special case with orthogonal beams, the coupling matrix reduces to the Identity matrix. Assuming a certain power azimuth spectrum (PAS) and azimuth spread (AS), the coupling matrix can be pre-computed and stored in a table. Adaptive update of the matrix is also a possibility based on measurements/estimates of the uplink spatial covariance matrix.

Since the local maxima in the transmitted power azimuth spectrum will correspond to one of the steering directions, the system is considered stable and not in overload provided that $$P(\bar{\phi}_n) < P_{threshold} \forall n \in [1, 2, \ldots, N]. \tag{14}$$

This means that prior to admission of a new user, the new power to be allocated per beam is estimated and mapped into a sampled version of the power azimuth spectrum according to equation (13), and it is checked whether the criterion set out in equation (14) is fulfilled before the user is granted capacity.

As illustrated in FIG. 3, the power increase per beam is jointly estimated based on the power per beam prior to admission and information on the new user. To achieve this, the estimation unit 44 uses input signals to a digital beamformer network 41 to derive an estimation of new power levels for each of the beams #1 to #N based on user-specific information on a new user, the directional power level estimations being supplied to an AC functionality 45. Each input signal indicates the present or actual power $P_1$ to $P_N$ of the respective beams. The beamformer network 41 outputs M signals to the SA 10 to generate the desired azimuthal power distribution. In the present case, the user-specific information may comprise at least one of the required Eb/No, the bitrate, a pilot measurement, and the selected beam for the new user.

It is noted that for cases where the elements of the SA 10 are combined to form the sector beam as well, the antenna gain of the sector beam will be smaller than the gain of the directional beams. The ratio $\Psi = G_{sector}/G_{beam}$ is defined as the gain difference between the sector beam and directional beam patterns, respectively. Then, the approximation $\Psi \approx 1/M$ can be applied. Hence, for M=4 the gain difference is in the order of 6 dB. Therefore, the secondary common pilot channels (S-CPICH) are transmitted with 6 dB lower power compared to the primary common pilot channel, so the coverage remain the same for the primary and secondary pilot.

In case of DL transmit diversity using two antenna ports, there is no need to apply directional power based AC. Conventional power based AC is still applicable for this case. Hence, users can be admitted to the system provided that the sum of the powers feed to the two antenna ports remains below the threshold $P_{threshold}$. The capacity gain from using transmit diversity is then automatically captured by the AC algorithm, since the required Eb/No per user will be lower and more users can therefore be admitted under the same transmit power constraint.

It is noted that this conclusion is valid for both open and closed loop transmit diversity schemes, independent of whether two spatially separated antennas are applied or one dual polarized antenna.

A grid of fixed beams and DL transmit diversity can be combined within the limitations of the UTRAN (Universal Mobile Telecommunications System Terrestrial Radio Access Network) standard. This might be achieved by using a dual polarized antenna array at the BS 20 and then use a grid of conventional beams for each polarization having the exact same steering directions or being offset, i.e. using interleaved beams. The signals feed to the two polarizations are then formed by using either open or closed loop transmit diversity.

Using such a scheme, an extended version of the directional power based AC scheme discussed should be used. It is assumed that N beams are used per polarization (pol1 and pol2), having assigned the power levels $$\bar{P}_n^{Pol1} \wedge \bar{P}_n^{Pol2}, \tag{15}$$

to the two polarizations and beam number n. For the special case where the steering directions of the beams for the two polarizations are identical, it can be approximated $$\bar{P}_n = \bar{P}_n^{Pol1} \bar{P}_n^{Pol2}, \tag{16}$$

and then used the equation (13) to obtain an equivalent expression of the transmitted power azimuth spectrum, and subsequently allow a new user access to the system provided the condition defined in equation (14) remains valid. For the general scenario where beams on the two polarizations are interleaved, i.e. different steering directions are used for beams corresponding to the two polarization directions, equation (16) is not valid and will have to be extended by applying a beam coupling matrix between the beams at the two polarizations.

A simple power increase estimator (PIE) which can be used in the estimation unit 44 is derived in the following, for the case where a grid of fixed beams is applied, as in the second preferred embodiment. However, the estimator derived here can easily be extended to the case where continuous BF is used.

For PIE using a grid of fixed beams, the primary objective is to estimate the power increase for all beams. Once the power allocated per beam is known, an estimate of the effective power azimuth spectrum according to equation (13) can be obtained. It is noted that it is not sufficient to only estimate the power increase of the beam where the new user is requesting capacity, since there is likely to be significant coupling between the different DL beams. Therefore, the following information should be available at the estimation unit 44 for the directional DL PIE, as indicated in FIGS. 2 and 3:

Measurements of the power allocated per beam before admission of the new user;

bitrate of the new user ($R_{user}$);

required Eb/No ($p_{user}$);

pilot report from the new user, that is Ec/Io measurement ($P_{user}^{pilot}$);

the new user is allocated beam number m∈[1,2, ... N]. This information is obtained from UL DoA estimation, which will be estimated from the Random Access Channel (RACH);

power of primary and secondary common pilot signals;

an estimate of the beam coupling matrix, assuming a Laplacian power azimuth spectrum of the radio channel, and a given azimuth spread of 5-10 degrees.

The power allocated to each beam after admission of the new user can be approximated as $$\hat{P}_{n,new} = \begin{cases} P_n^{SCPICH} + P_n^{user}\beta_n + P_{user} & \text{for } n = m \\ P_n^{SCPICH} + P_n^{user}\beta_n & \text{for } n \neq m \end{cases}, \quad (17)$$

Here, $P_{user}$ is the power allocated to the new user and $\beta_n$ expresses the power increase of the existing users in beam n. It is noted that $\beta_n \geq 1$ to include the power increase of the existing users due to admission of the new user. The following approximation can be applied $$\beta_n = \begin{cases} 1 + \rho_{user}\dfrac{R_{user}}{2R_c} & \text{for } n = m \\ 1 + \rho_{user}\dfrac{R_{user}}{2R_c}W(\bar{\phi}_m;\bar{\phi}_n) & \text{for } n \neq m \end{cases} \quad (18)$$

This means that the users allocated to beam m are assumed to increase their power level with a fraction proportional to the required Eb/No and bitrate of the new user. The power increase of the existing users in the remaining beams (n≠m) is weighted with the function $W(\phi_m;\phi_n)$, since the users in these beams only experience the power $W(\phi_m;\phi_n)P_{user}$ of the new user. Based on equation (17), we can express Eb/No of the new user as $$\rho_{user} = \frac{R_c}{R_{user}} \frac{h_{user}W(\bar{\phi}_m;\phi_{user})P_{user}}{P_{noise} + P_{user}^{other} + h_{user}(1-\alpha)\left[\sum_{n=1}^{N}(P_n^{SCPICH} + \beta_n P_n^{user})W(\bar{\phi}_n;\bar{\phi}_m) + \psi P_{pilot}\right]} \quad (19)$$

where $h_{user}$ is the pathloss towards the new user, $\phi_{user}$ is the azimuthal direction towards the user, $P_{other}$ is the other-cell interference experienced by the user, $P_{noise}$ is the noise power, and α is the downlink orthogonality factor. It should be emphasized that the azimuthal direction towards the new user ($\phi_{user}$) is unknown, only the selected beam is known. For simplicity, it is therefore assumed that $\phi_{user} = \bar{\phi}_m$, so that an expression for the required transmit power towards the new user can be obatined by re-arranging equation (19) as follows:

$$P_{user} = \rho_{user}\frac{R_{user}}{R_c}\left[\frac{P_{noise} + P_{user}^{other}}{h_{user}} + (1-\alpha)\left[\sum_{n=1}^{N}(P_n^{SCPICH} + \beta_n P_n^{user})W(\bar{\phi}_n;\bar{\phi}_m) + \psi P_{pilot}\right]\right] \quad (20)$$

All parameters in equation (20) are known, except the the pathloss towards the user, the level of other-cell interference, and noise power. The DL orthogonality factor can be estimated from the UL power delay profile or from the received pilot report, Eb/No, and the transmission power of existing users.

The other-cell interference, noise, and pathloss term can be derived from the pilot measurement reported by the new user, which equals $$\rho_{user}^{pilot} = \frac{h_{user}\psi P_{pilot}}{P_{noise} + P_{user}^{other} + h_{user}\left[\sum_{n=1}^{N}(P_n^{SCPICH} + P_n^{user})W(\bar{\phi}_n;\bar{\phi}_m) + \psi P_{pilot}\right]}. \quad (21)$$

Re-arranging equation (21), an expression can be obtained for the unknown variables of equation (20) as follows:

$$\frac{P_{noise} + P_{user}^{other}}{h_{user}} = \frac{\psi P_{pilot}}{\rho_{user}^{pilot}} + \left[\sum_{n=1}^{N}(P_n^{SCPICH} + P_n^{user})W(\bar{\phi}_n;\bar{\phi}_m) + \psi P_{pilot}\right]. \quad (22)$$

It is noted that the pilot measurement is obtained prior to admission of the user. This means that it is implicitly assumed that the other-cell interference does not increase due to admission of the new user. Furthermore, equation (20) is only valid if Eb/No for a new user (after admission) exactly equals the required Eb/No, which of course never will be the case due to residual power control errors, caused by finite power control stepsize (1.0 dB), feedback errors, SIR estimation errors, etc. The validity of these approximations may be quantified via simulations. Such simulations are helpful to prove the validity of the proposed AC scheme for the BS 20 with the SA 10, and also provide figures for the expected capacity gain of having the SA 10 at the BS 20 when using the proposed AC decision-rule.

Figure 4:
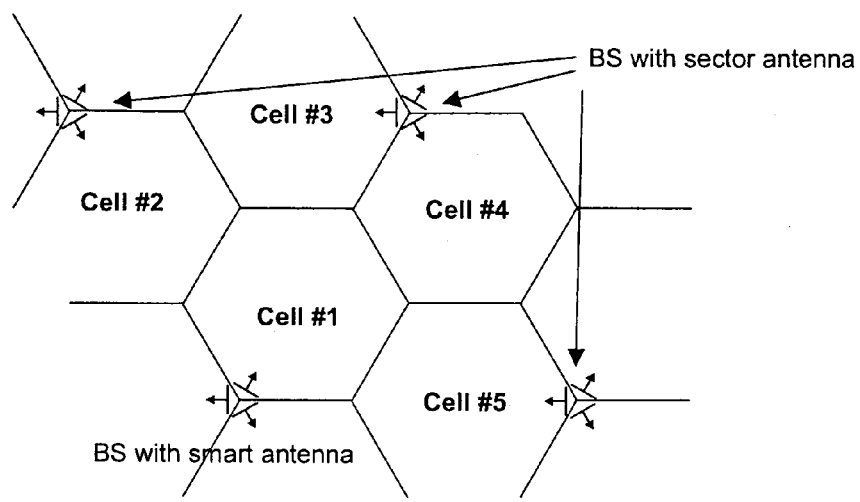
FIG. 4 shows an example for a network topology where the preferred embodiments can be implemented.

FIG. 4 indicates a network topology where a mixture of BSs with conventional sector antennas and SAs are used. In particular, three BSs with sector antennas are located at predetermined edges of radio cells #2, #3, #4 and #5, while a BS with an SA is located at a predetermined edge of a radio cell #1. Thereby, a good coverage of the total cell area can be guaranteed.

The system is deemed to be overloaded when $P(\phi) > P_{threshold}$. When the system enters a state where $P_{threshold} - P_{offset} < \text{Max}\{P(\phi)\} < P_{threshold}$, the system is still stable but no users are admitted. Here $P_{offset}$ can be interpreted as a hysteresis margin which serves as a protection power for increase estimation errors. Hence the magnitude of $P_{offset}$ significantly depends on the accuracy of the derived direction power increase estimator. Thus, $P_{target} = P_{threshold} - P_{offset}$. In order to extract the accuracy of the power increase estimator, the relative estimation error is defined as follows:

$$\varepsilon = \frac{\text{Max}\{P(\phi)\} - \text{Max}\{\hat{P}(\phi)\}}{P_{threshold}}. \tag{23}$$

Given an SA configuration with N=8 beams, M=4 antennas, and 5 degrees azimuth spread, the beam coupling matrix defined in equation (13) equals $$\begin{bmatrix} 1.00 & 0.44 & 0.02 & 0.06 & 0.01 & 0.06 & 0.02 & 0.42 \\ 0.44 & 1.00 & 0.44 & 0.02 & 0.06 & 0.01 & 0.06 & 0.02 \\ 0.02 & 0.44 & 1.00 & 0.44 & 0.02 & 0.06 & 0.01 & 0.06 \\ 0.06 & 0.02 & 0.44 & 1.00 & 0.44 & 0.02 & 0.06 & 0.01 \\ 0.01 & 0.06 & 0.02 & 0.44 & 1.00 & 0.44 & 0.02 & 0.06 \\ 0.06 & 0.01 & 0.06 & 0.02 & 0.44 & 1.00 & 0.44 & 0.02 \\ 0.02 & 0.06 & 0.01 & 0.06 & 0.02 & 0.44 & 1.00 & 0.44 \\ 0.42 & 0.02 & 0.06 & 0.01 & 0.06 & 0.02 & 0.44 & 1.00 \end{bmatrix}. \tag{24}$$

Thus, the coupling between two neighbouring beams equals 0.44, while the coupling to adjacent beams separated by at least one beam is less than 0.06.

Figure 5:
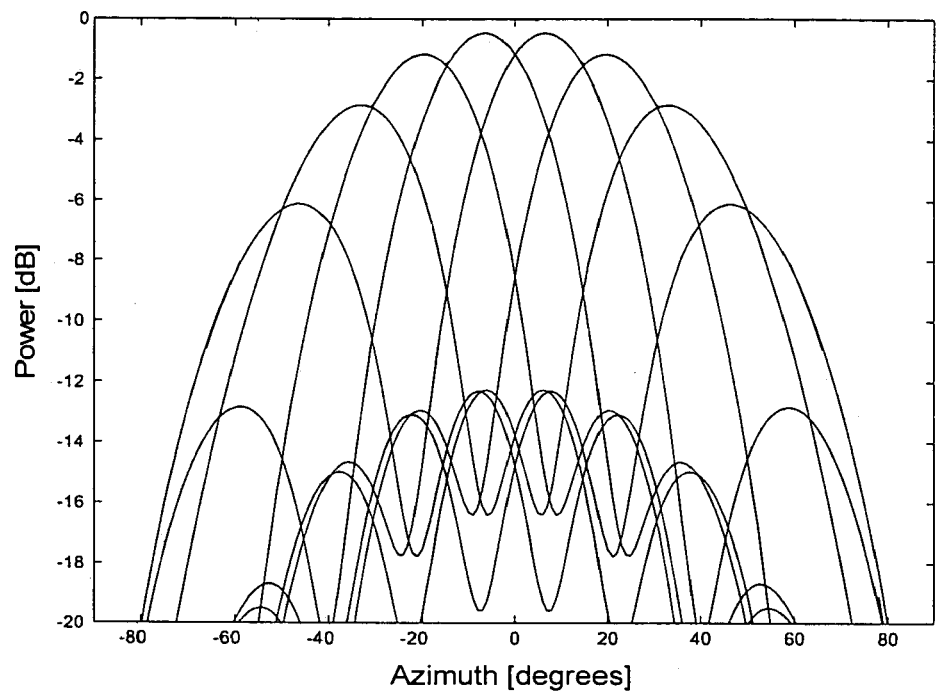
FIG. 5 shows a normalized radiation pattern of an antenna array.

FIG. 5 shows a diagram indicating normalized effective directional beam patterns for the N=8 directional beams. It is noted that the peaks at the azimuths ±60 degrees with 13 dB attenuation are side-lopes, and not main-beams. Furthermore, the beams pointing in the azimuth direction ±60 degrees are attenuated approximately 10 dB compared to broadside. Assuming a pathloss exponent of 3.5, this is equivalent to a 50% coverage reduction which complies perfectly with the planned coverage area per cell in FIG. 4.

The antenna weight vector for the sector beam can be computed as an average of the directional beam vectors, i.e.

$$A = \frac{1}{N} \sum_{n=1}^{N} c(\bar{\phi}_n). \tag{25}$$

Using this approach, the sector beam provides coverage for the complete cell area.

Figure 6:
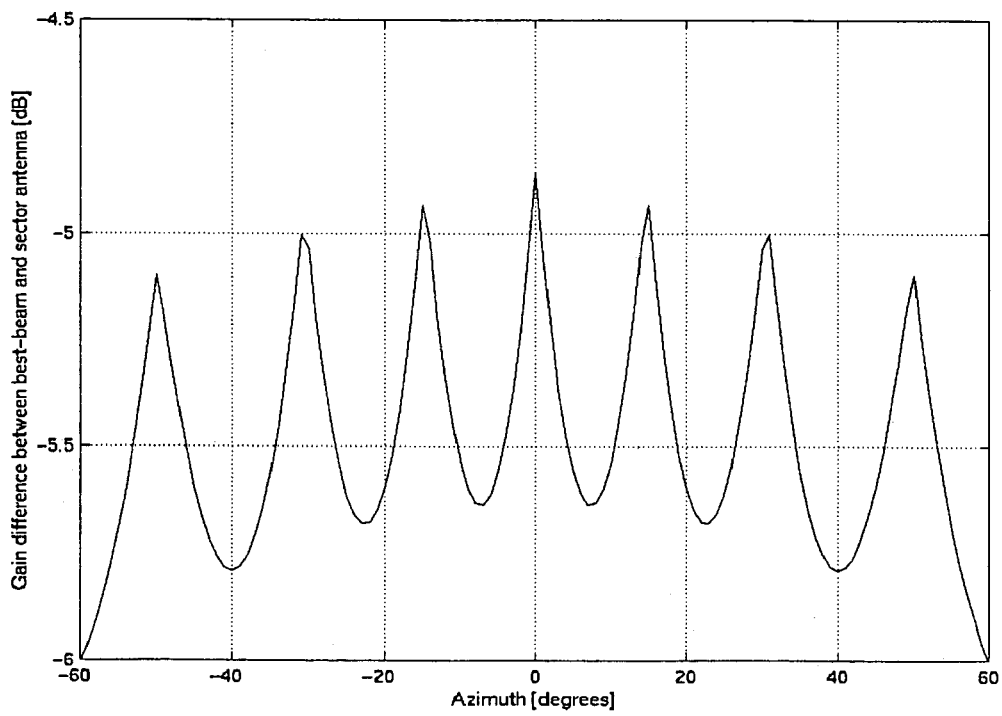
FIG. 6 shows a diagram indicating a gain difference with respect to the best beam of an antenna array.

FIG. 6 shows a diagram indicating the gain difference (in decibel) between the sector beam and the best directional beam pattern ($\Psi = G_{sector}/G_{beam}$) as a function of the azimuth angle. For the azimuthal range −60 to +60 degrees, it can be approximated $\Psi = -5.6$ dB with a maximum error of ±0.5 dB. A constant value $\Psi = -5.6$ dB may therefore be used when estimating the path loss from the primary CPICH towards the UE. Alternatively, different values of $\Psi$ can be used depending on the selected beam.

Figure 7:
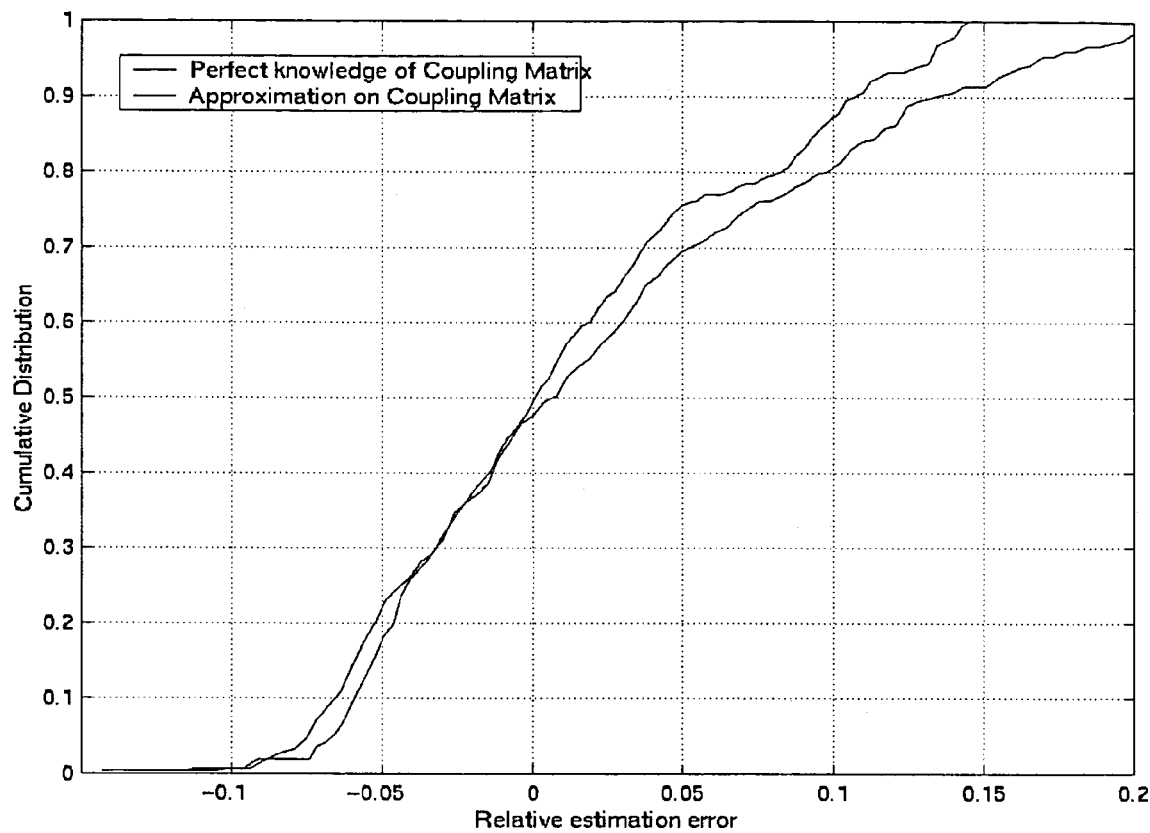
FIG. 7 shows a cumulative distribution function of a relative estimation of the maximum in the effective transmitted power azimuth spectrum.

FIG. 7 shows a diagram indicating a cumulative distribution function (cdf) of the relative estimation (PIE) error for two different cases. The mainly upper curve correspond to the case where the coupling matrix used by the PIE is perfectly known. The mainly lower curve represent the relative PIE error for a scenario where the applied coupling matrix is slightly different from the true one. Here the matrix is computed for an azimuth spread of 10 degrees assuming that the radio channels power azimuth spectrum is Gaussian distributed, even though the radio channels true power azimuth spectrum follows a Laplacian function with 5 degrees azimuth spread.

It is observed that the relative PIE error is relative small for both considered cases. For the case where there exists a mismatch between the true and applied coupling matrix, the relative error only increases from 0.11 to 0.13 at the 90% fractile. Hence, the derived directional PIE seems to be relative robust towards minor approximation errors on the coupling matrix. For typical urban environments where the azimuth spread normally is on the order of 5-10 degrees, it is therefore recommended to pre-compute the coupling matrix once using a fixed azimuth spread. It is not worth estimating the azimuth spread at the BS 20 on a frequent basis. As the performance gain from using BF is well known to decrease as a function of azimuth spread, it is recommendable to pre-compute the coupling matrix using 10 degrees azimuth spread for BS's installed in typical urban areas.

Using the proposed directional AC scheme, the network remains stable. The coverage is maintained, and the required Eb/No for all users is maintained. The capacity gain from using an SA with M=4 antennas and N=8 beams compared to conventional BS sector antennas can be quantified in terms of throughput per cell. It is assumed that the required Eb/No for the users remain the same independent of whether the signal to the UE is being transmitted on a sector beam or on a directional SA beam. This assumption should be valid, since the applied antenna array algorithm don't provide any diversity gain and the channel estimation is not degraded as S-CPICH are used on directional beams.

The throughput for the cell equipped with an SA is found to increase with a factor of 2:22 when users are generated according to case #1 in FIG. 4, while the gain equals 2.56 for case #2. The capacity gain is lower for case #1 because the interference tend to be more directional, while it appears as spatial uniform for case #2. Using conventional BF it is well-known that the maximum gain is obtained in spatially white interference. Under these conditions, BF is equivalent to MRC and Optimum Combining provided that no azimuthal dispersion exists in the radio channel.

Furthermore, it is noted that the obtained capacity gain is on the order of the theoretical expected gain, which further implies that the proposed directional AC scheme works correctly. The expected capacity gain is reflected by the directional AC algorithm.

The capacity gain obtained from using an SA is likely to be sufficiently high so that channelization code shortage becomes the limiting factor, instead of the actual interference level at the radio interface. This limitation can be solved by adding more codes (secondary scrambling codes) to cells equipped with an SA. In "Spreading and modulation (FDD)", ETSI specification 3GPP TS 25.213, V3.3.0 and in "Physical channel and mapping of transport channels onto physical channels (FDD)", ETSI specification 3GPP TS 25.211, V3.4.0, a discussion on the code impact on cells which use SAs is disclosed.

One primary scrambling code which constitutes a sub-segment of a complex Gold sequence can be allocated to each cell. There are 512 possible primary scrambling codes, which are divided into 64 distinct code groups with 8 codes per group. The scrambling code is associated with one channelization code tree used for own cell user separation.

Each primary scrambling code is furthermore associated with up to 15 secondary scrambling codes, which may be used optionally. Deployment of this extra code means that an extra channelization code tree becomes available, so that potential channelization code shortage problems can be avoided. Any physical channels can be transmitted under either the primary or secondary scrambling code, except the pilot signals, primary CPICH and primary CCPCH which always are transmitted under the primary scrambling code using channelization code number 0 and 1, with spreading factor 256. Furthermore, the primary CPICH and primary CCPCH should be broadcast in the entire cell, so that beamforming on these channels is not allowed. By default, the primary CPICH can be used as phase reference for the downlink channels AICH, PICH, SCH, so that beamforming is not applicable on these channels either.

In cases where downlink shared packet channels (DSCH) are applied and mapped to multiple physical downlink shared channels (PDSCH's) (multi-code option), all PDSCH's that a given UE is receiving should be transmitted under the same scrambling code (either primary or secondary). The allowed spreading factor for PDSCH's is in the range 4 to 256. A DPCH is by default associated with one DSCH that carries all the relevant layer 1 control information. Beamforming is allowed on PDSCH channels provided that the associated DPCH is transmitted in the same beam.

The secondary common pilot channel (S-CPICH) may be transmitted under either the primary or secondary scrambling code, using an arbitrary channelization code with spreading factor 256. The S-CPICH is not necessarily to be transmitted over the entire cell, so beamforming is applicable on this channel. Higher layer signaling may inform the UE to use a specific S-CPICH as phase reference for the downlink DPCH. In cases where DSCH is utilized, the same S-CPICH should be used as phase reference for the PDSCH and the associated DPCH. Additionally, it should be noted that an S-CPICH transmitted under the primary scrambling code may serve as phase reference for a PDSCH and DPCH transmitted under a secondary scrambling code.

The disadvantage of introducing a secondary scrambling code is that signals transmitted under the primary and secondary scrambling code are non-orthogonal, while physical channels transmitted under the same scrambling code are orthogonal. However, this orthogonality is partly destroyed as the signal is transmitted through the time dispersive downlink radio channel. This means that ideally, only the primary scrambling code should be deployed as long as there are a sufficient amount of channelization codes available. If the channelization codes associated with the primary scrambling code are all used, a second scrambling code should be introduced. Hence, an adaptive code assignment scheme is in principle the preferred option, depending on the channelization code tree load.

Figure 8:
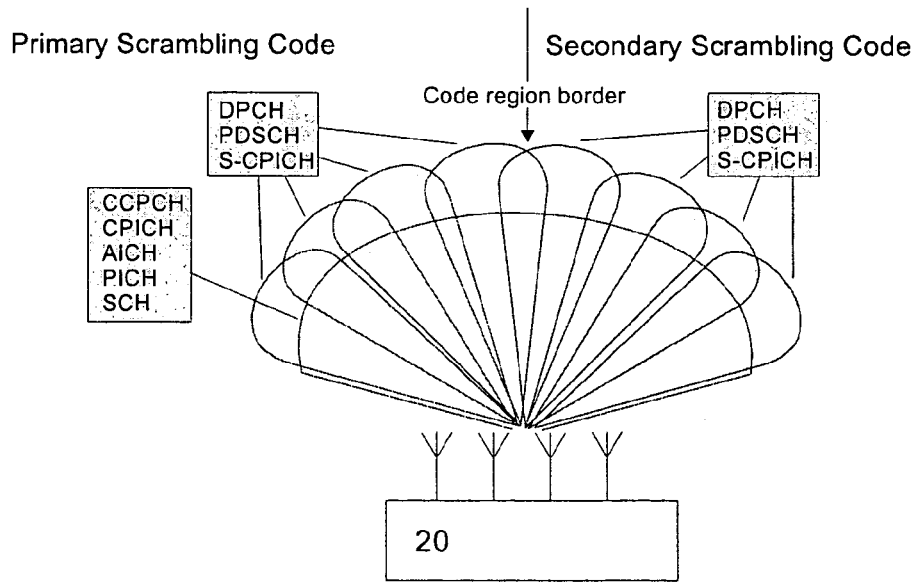
FIG. 8 shows a beam allocation of a primary and secondary scrambling code in case of a cell splitting.

For the case of the second preferred embodiment with a grid of beams in the DL, scrambling codes can be allocated to the different beams. FIG. 8 shows beam allocation of primary and secondary scrambling code in case of cell splitting. Here, half of the beams are using the primary scrambling code and the remaining beams are using the secondary scrambling code. Depending on the load per beam, the code region border could be adjusted, so e.g. 3 beams are using the primary while 5 beams are using the secondary. It is noted that using the scheme shown in FIG. 8, the maximum allowed throughput per beam will be slightly lower for the beams of the secondary scrambling code compared to the beams of the primary scrambling code. This will be the case because the signals transmitted on the sector beam interfere more on the signals transmitted under the secondary scrambling code. Signals transmitted in the beams of the primary scrambling code and the sector beam are using channelization codes from the same code tree, and are therefore less sensitive to interference from the sector beam.

Having users allocated to two scrambling codes, while they all could have been transmitted under the same primary scrambling code, will therefore in general lead to a higher transmit power due to the higher cross correlation between users transmitted under the primary and secondary scrambling code. Higher transmit power results in more other cell interference at neighboring cells, which again can be mapped to a loss of soft capacity. This again implies that an adaptive code allocation algorithm should be derived, so that the use of one or multiple secondary scrambling codes depends on the channelization code tree load under the primary scrambling code.

Thus, initially, only the primary scrambling code should be used in all beams. When the code load exceeds a certain threshold, a subset of the beams may be allocated to the secondary scrambling code instead, meaning that logical handovers will be executed for all UEs located in the beams which undergo a code change (e.g. the right hand beams in FIG. 8). This might result in dropped calls due to handover failures. To avoid handover failures and the extra required signaling, an alternative approach could be used, where both the secondary and primary scrambling code are always used. Thereby avoiding to have an adaptive code allocation scheme. However, as already discussed, this might result in a loss of soft capacity. Depending on the degree of loss, it can be determined whether it is most appropriate to use a fixed or adaptive code allocation scheme.

It is noted that code splitting is generally not restricted to the application of two scrambling codes. However, having three scrambling codes might require in some cases to avoid code shortage (hard blocking).

In the following, two code allocation strategies are considered:
1. a 4-4 Configuration in which beams No. 1-4 are using the primary code and beams No. 5-8 are using the secondary code as shown in FIG. 8, when counting the beams starting from the left side.
2. a 5-3 Configuration in which beams No. 1-5 are using the primary code and beams No. 6-8 are using the secondary code.

Figure 9:
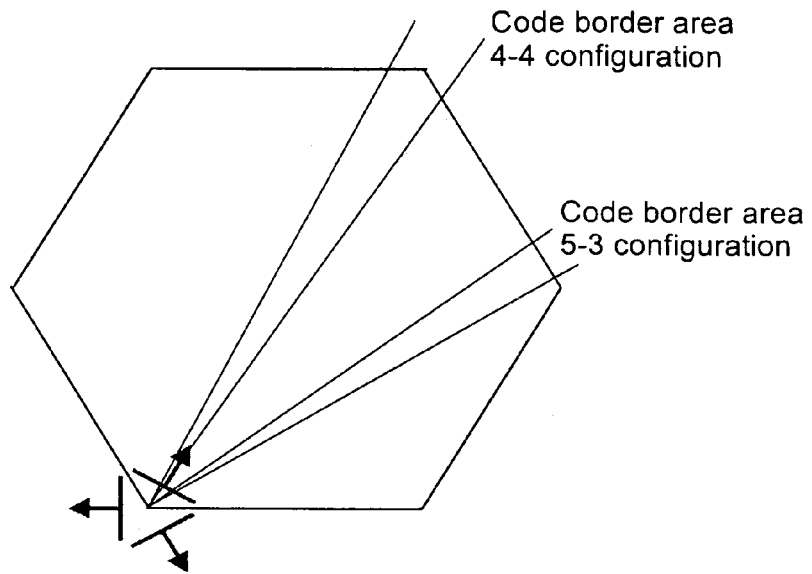
FIG. 9 shows a diagram indicating overlapping areas between primary and secondary scrambling codes.

Here it is expected that the first case results in the largest capacity loss, as the code region border is located in the azimuth direction with the highest density of users. For the second case, the code region border is shifted to an azimuth direction with a smaller density of users. This is illustrated in FIG. 9 which shows an area where there is an overlap between primary and secondary scrambling code ("code border area").

Eb/No calculations at each UE can be computed according to the following equation:

$$\rho = \frac{R_c}{R_{user}} \frac{P_{user}}{P_{noise} + P_{other} + P_{own} + (1-\alpha)P'_{own}}, \quad (26)$$

where $P_{own}$ is the own-cell interference transmitted under the same scrambling code as the desired user, and $P'_{own}$ is the own-cell interference transmitted under other scrambling codes. For single scrambling code operation $P'_{own}=0.0$ for all cases. Hence, the performance degradation from using multi-code operation is expected to be very sensitive to the value of the downlink orthogonality factor ($\alpha$).

Figure 10:
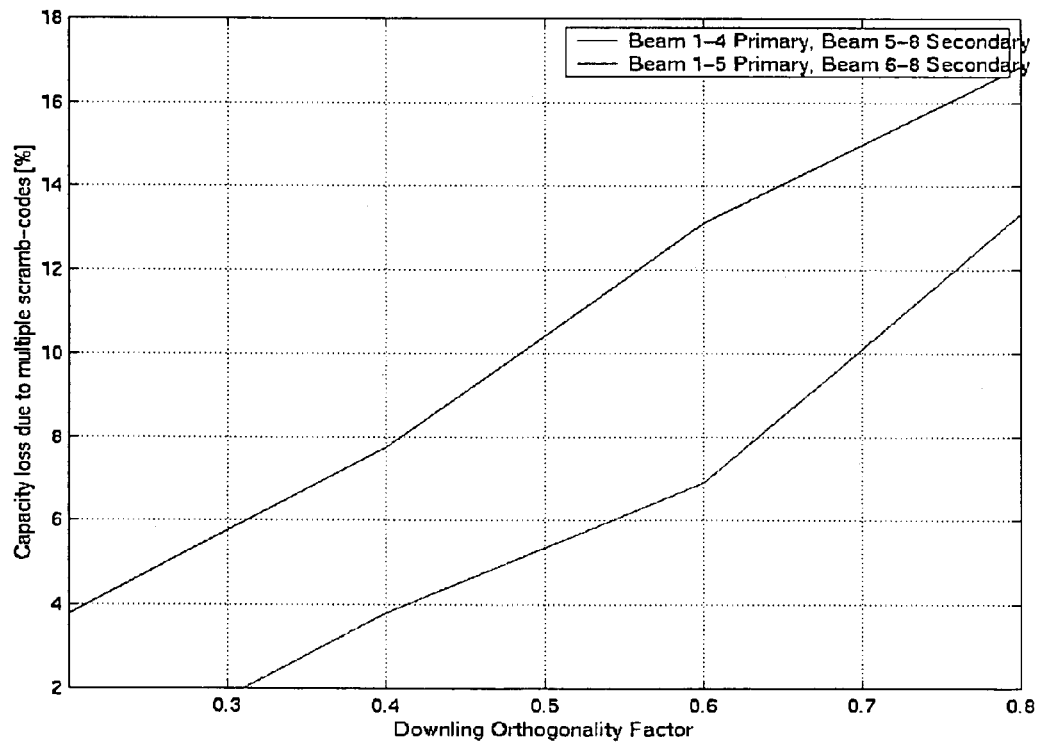
FIG. 10 shows a diagram indicating a capacity loss of using two scrambling codes versus the downlink orthogonality factor.

The percentage of a capacity loss or loss in throughput when using two scrambling codes relative to one code is presented in FIG. 10, versus the downlink orthogonality factor. As expected, the capacity loss is increasing with the orthogonality factor, while the capacity loss is higher for the above 4-4 configuration (upper curve in FIG. 10) as compared to the above 5-3 configuration (lower curve in FIG. 10). For an orthogonality factor of 0.4-0.5 the loss is on the order of 5%-11% depending on the selected code allocation strategy. This is considered to be a marginal capacity loss compared to the huge gain from deploying an SA.

It is therefore recommendable to use two scrambling codes permanently for BSs which use an SA. Especially for environments where the DL orthogonality is good, so that the likelihood of running out of codes before radio resources is high. Provided that sufficient channelization codes under the primary scrambling code are available to support 5 directional beams and the sector beam, it is furthermore suggested to use the 5-3 code allocation scheme. Hence, directional beams No. 1-5 are transmitted under the primary scrambling code, while beams No. 6-8 are transmitted under the secondary scrambling code. Using this code allocation strategy will results in a loss of only 6% for a typical urban vehicular A channel, as illustrated in FIG. 10.

Figure 11:
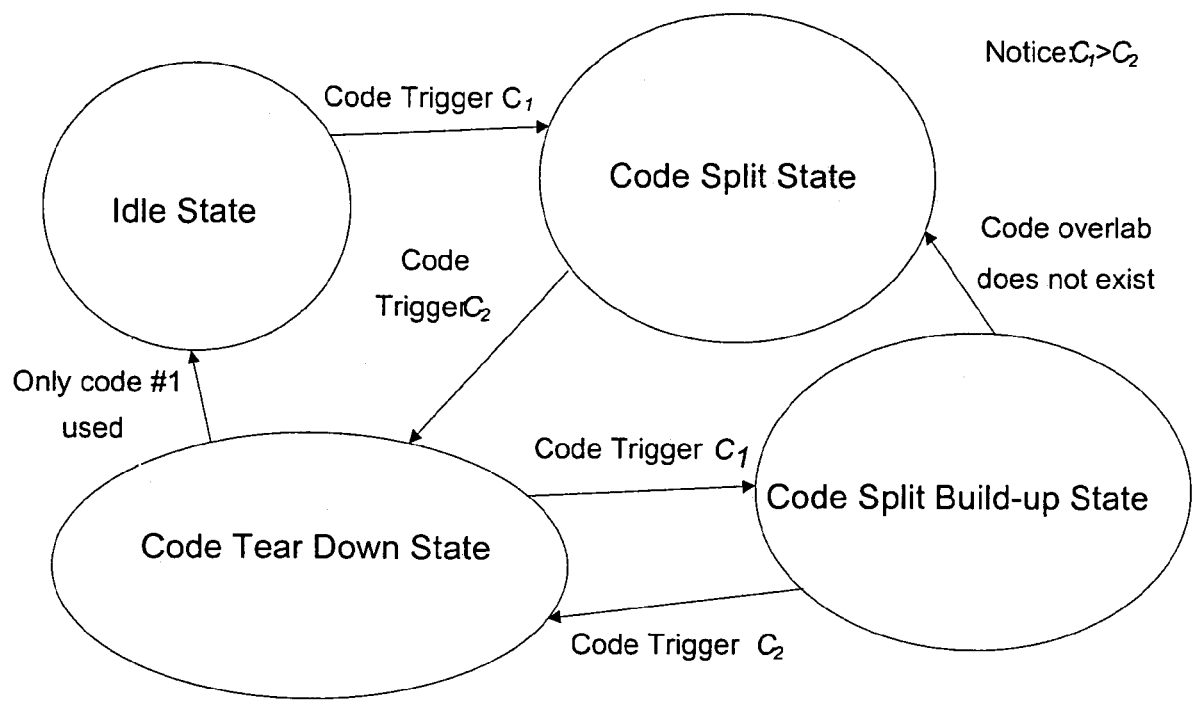
FIG. 11 shows a state diagram for an adaptive code allocation scheme.

In case an adaptive code allocation scheme is required, it could be implemented according to the state diagram shown in FIG. 11. In an idle state, only one scrambling code is used per sector. When a first code trigger C1 (corresponding to a first predetermined code load) is detected, a change to a code split state can be initiated, where the code region border is selected and a handover to the second scrambling code is initiated. Then, when a second code trigger C2 (corresponding to a second predetermined code load) is detected, a code tear down state is entered, where all new users are assigned to code #1 which means that code #2 is slowly de-activated and azimuthal code overlap exists. When only code #1 is used, the idle state is entered again. If the first code trigger C1 is detected in the code tear down state, a code split build-up state is entered, where new users are assigned to codes according to their azimuthal position. When a code overlap does not exist, the code split state is entered. If the second code trigger C2 is detected in the code split build-up state, the code tear down state is entered again. It is noted that the first code trigger is selected to correspond to a higher code usage or coad load than the second code trigger C2.

If two scrambling codes are used, the PIE needs to be updated, since the interference coupling between the beams depends on the used scrambling code. However, the estimator is easily extended by only applying the orthogonality factor ($\alpha$) to own-cell interference, which is transmitted under the same scrambling code as the desired signal. Other-cell interference transmitted under another code are not weighted by $\alpha$.

It is assumed that the first $N_p$ beams are transmitted under the primary scrambling code and the remaining beams are using the secondary code. Hence the set of beams $B_p=[1, 2, \ldots, N_p]$ are using the primary code, while the beams $B_s=[N_p+1, N_p+2, \ldots, N]$ are using the secondary code. The new user is assumed to be allocated to beam m, so the new power for each beam is estimated according to equation (17), where $$\beta_n = \begin{cases} 1 + \rho_{user}\frac{R_{user}}{2R_c} & \text{for } n = m \\ 1 + \rho_{user}\frac{R_{user}}{2R_c}W(\bar{\phi}_m; \bar{\phi}_n) & \text{for } n \neq m \wedge n \in S_m \\ 1 + \rho_{user}\frac{R_{user}}{R_c}W(\bar{\phi}_m; \bar{\phi}_n) & \text{for } n \neq m \wedge n \notin S_m \end{cases} \quad (27)$$

where $S_m = B_p$ if $m \in B_p$, otherwise $S_m = B_s$. The Eb/No for the new user is subsequently expressed as $$\rho_{user} = \frac{R_c}{R_{user}} \frac{h_{user}W(\bar{\phi}_m; \phi_{user})P_{user}}{P_{noise} + P_{user}^{other} + h_{user}\begin{bmatrix} (1-\alpha)\sum_{n \in S_m}(P_n^{SCPICH} + \beta_n P_n^{user})W(\bar{\phi}_n; \bar{\phi}_m) + \\ \sum_{n \notin S_m}(P_n^{SCPICH} + \beta_n P_n^{user})W(\bar{\phi}_n; \bar{\phi}_m) + k\psi P_{pilot} \end{bmatrix}} \quad (28)$$

where $k=\alpha$ for $m \in S_p$, otherwise $k=1$. From equation (28) the power to be allocated to the new user can be expressed as $$P_{user} = \rho_{user}\frac{R_{user}}{R_c}\left[\frac{P_{noise} + P_{user}^{other}}{h_{user}} + \begin{bmatrix} (1-\alpha)\sum_{n \in S_m}(P_n^{SCPICH} + \beta_n P_n^{user})W(\bar{\phi}_n; \bar{\phi}_m) + \\ \sum_{n \notin S_m}(P_n^{SCPICH} + \beta_n P_n^{user})W(\bar{\phi}_n; \bar{\phi}_m) + k\psi P_{pilot} \end{bmatrix}\right] \quad (29)$$

The term with noise, other-cell interference, and pathloss is estimated according to equation (22). The sampled version of the effective power azimuth spectrum is obtained according to equation (13) and finally a decision on admission of the user is conducted according to the criterion in equation (14).

The derived estimator has been tested and found to have an accuracy which is similar to the accuracy of PIE derived for single scrambling code operation.

It is noted that the estimation can be performed for anv load-dependent directional transmission parameter. In particular, an alternative transmission parameter which can be used in place of the above described directional transmission power may be the throughput per direction, i.e. bitrate per beam or payload per some time interval per beam, such that the invention is implemented in a throughput-based AC scheme. In this case, a directional throughput is estimated in the estimation unit 44 of the above embodiments for each available direction or beam based on the antenna pattern of the SA 10 and/or a corresponding coupling matrix. Based on the estimation result, which may be discrete parameter values per direction or an azimuth spectrum of the directional parameter, it is then determined in the AC functionality 45 whether a new capacity request should be granted or rejected. Hence, users are admitted provided that the total cell throughput in each available direction is below a certain predefined throughput threshold. Nevertheless, it is to be noted that the present invention is not restricted to the above mentioned specific directional transmission parameters and can be implemented for any kind of transmission parameter suitable to be used as a load indicator for admission control.

Using the proposed directional AC scheme assures that the full capacity from deploying an SA can be obtained. The capacity gain is estimated to be on the order of 2.2-2.6 for the DL when using 4 antenna elements and 8 beams. The proposed AC algorithm takes the load per beam and mutual beam coupling into account, which help maintain a stable system.

The proposed directional AC algorithm for the BS 20 with the SA 10 requires at least one of a number of additional parameters compared to the conventional AC for BS with standard sector antennas. Possible additional inputs are illustrated in FIG. 12.

Figure 12:
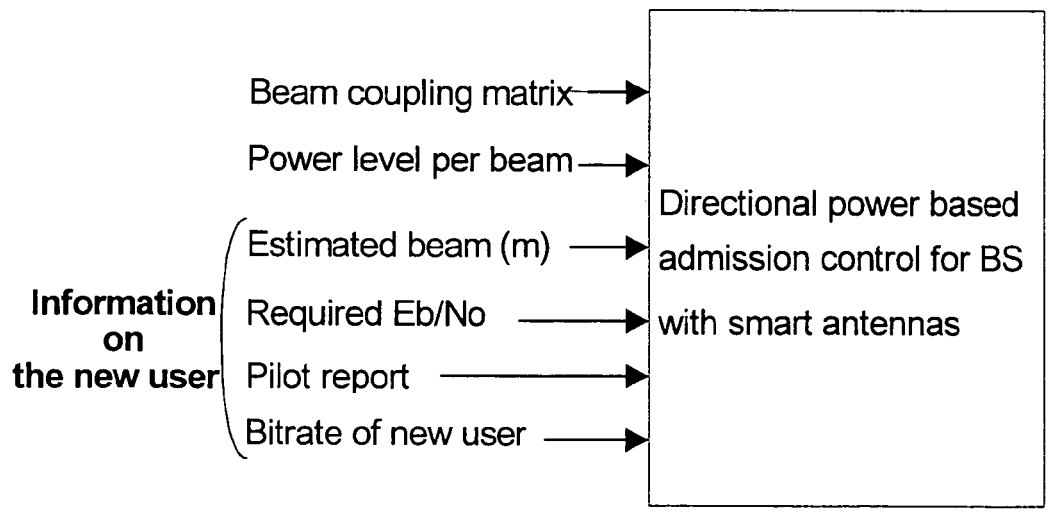
FIG. 12 shows required input parameters for the directional power based admission control scheme according to the present invention.

According to FIG. 12, the power level per beam before admission of the user may be required, knowledge of the beam coupling matrix, and the estimated beam (m) for the new user are some of the extra parameters which may be additionally required compared to standard AC. Hence, additional Node-B measurements are needed.

The present admission control scheme can be applied to control both circuit switched and packet switched radio bearers.

The AC functionality according to the present invention may as well be implemented in a radio network controller or any other suitable network element having the required input parameters available. In the case where the admission control is implemented in the RNC, the directional AC scheme will also have an impact on the Iub interface between RNC and BS.

When SA's are deployed, the load control (LC) and packet scheduler (PS) also have to be modified, since a directional power based load measure is used. The PS could be upgraded so as to also support scheduling for SA's. This may also include a re-definition of information flow between PS-AC and PS-LC.

It is noted that the present-invention is not restricted to the above described preferred embodiments but can be applied in any network element with any directional antenna, in which a admission control is performed. Thus, the preferred embodiments may vary within the scope of the attached claims.

The invention claimed is:

1. A method, comprising:
   determining a location of a terminal device to be admitted in a cellular network;
   estimating a load-dependent directional transmission parameter of a directional antenna, which results from an admission of said terminal device;
   admitting said terminal device when said directional transmission parameter does not exceed a predetermined threshold in any available direction of said directional antenna;
   selecting one of a finite set of beams for transmission to said terminal device based on said determined location;
   estimating an increase of said load-dependent directional transmission parameter for directions of said finite set of beams based on a coupling matrix defining coupling coefficients between said finite set of beams,
   wherein said estimating said increase comprises pre-computing said coupling matrix using a fixed azimuth spread of said finite set of beams.

2. A method according to claim 1, wherein said estimating said load-dependent directional transmission parameter comprises determining a directional transmission power by calculating a transmission power azimuth spectrum using a beam pattern of said directional antenna.

3. A method according to claim 2, wherein said calculating said transmission power azimuth spectrum comprises using an azimuth dispersion in a radio channel.

4. A method according to claim 1, wherein said load-dependent directional transmission parameter comprises a throughput per direction.

5. A method according to claim 2, wherein said calculating said transmission power azimuth spectrum comprises adding a directional power increase, caused by said admission, to a transmission power azimuth spectrum obtained before said admission.

6. A method according to claim 1, further comprising:
   selecting a steering direction of a beam used for transmission to said terminal device to correspond to said determined location.

7. A method according to claim 6, wherein said estimating comprises estimating an increase of said load-dependent directional transmission parameter for all azimuth directions.

8. A method according to claim 7, further comprising:
   using said estimated increase to estimate a new azimuth spectrum of said load-dependent directional transmission parameter based on a supplied user-specific information.

9. A method according to claim 8, wherein said user-specific information comprises at least one of a ratio of bit energy to noise spectral density, a bit rate, a pilot measurement, and a direction of access estimate.

10. A method according to claim 1, wherein said estimating comprises deriving an estimation of new parameter levels for each beam of said finite set of beams.

11. A method according to claim 1, wherein said estimating said increase comprises updating said coupling matrix based on one of measurements or estimates of an uplink spatial covariance matrix.

12. A method according to claim 1, further comprising:
    estimating a new power azimuth spectrum of said load-dependent directional transmission parameter based on a supplied user-specific information using said estimated load-dependent directional transmission parameter.

13. A method according to claim 12, wherein said user-specific information comprises at least one of a ratio of bit energy to noise spectral density, a bit rate, a pilot measurement, and a selected beam for a new terminal device.

14. A method according to claim 1, wherein said directional antenna comprises a dual polarized antenna array, wherein selecting comprises providing said finite set of beams for each polarization, and wherein estimating said load-dependent directional transmission parameter comprises adding parameter estimations for each polarization.

15. A method according to claim 1, further comprising:
    allocating primary and secondary scrambling codes to different beams of said finite set of beams.

16. A method according to claim 15, wherein said allocating comprises initially allocating said primary scrambling codes to all beams of said finite set of beams, and further comprises subsequently allocating the secondary scrambling codes when a code load has exceeded a predetermined threshold.

17. A method according to claim 16, wherein said allocating comprises applying an adaptive code allocation scheme, and wherein said subsequently allocating the second scrambling codes comprises starting the allocating at a first code trigger and stopping the allocating at a second code trigger which corresponds to a larger code load.

18. A method according to claim 1, further comprising: providing a margin as a protection for parameter increase estimation errors.

19. A method, comprising:
determining a location of a terminal device to be admitted in a cellular network;
estimating a load-dependent directional transmission parameter of a directional antenna, which results from an admission of said terminal device;
admitting said terminal device when said directional transmission parameter does not exceed a predetermined threshold in any available direction of said directional antenna;
selecting one of a finite set of beams for transmission to said terminal device based on said determined location; and
allocating primary and secondary scrambling codes to different beams of said finite set of beams,
wherein said allocating comprises allocating a primary scrambling code to a first subset of beams, and further comprises allocating a secondary scrambling code to a second subset of beams.

20. A method according to claim 19, wherein said first subset and said second subset comprise four adjacent beams.

21. A method according to claim 19, wherein said first subset comprises five adjacent beams and said second subset comprises three adjacent beams.

22. An apparatus, comprising:
a processor configured to estimate, based on a determined location of a terminal to be admitted in a cellular network, a load-dependent directional transmission parameter of a directional antenna, which results from an admission of a terminal device; and
a controller configured to admit the terminal device when the estimated load-based direction transmission parameter does not exceed a predetermined threshold in any available direction of the directional antenna,
wherein the controller is further configured to select one of a finite set of beams for transmission to said terminal device based on said determined location,
wherein said processor is further configured to estimate an increase of said load-dependent directional transmission parameter for directions of said finite set of beams based on a coupling matrix defining coupling coefficients between said finite set of beams, and
wherein said processor is further configured to pre-compute said coupling matrix using a fixed azimuth spread of said finite set of beams.

23. An apparatus according to claim 22, wherein said directional antenna comprises one of an antenna array with a continuous beamforming capability or a finite set of beams.

24. An apparatus according to claim 22, wherein said directional antenna is located in a base station.

25. An apparatus according to claim 22, wherein said controller is located in a base station.

26. An apparatus according to claim 22, wherein said controller is located in a radio network controller.

27. An apparatus, comprising:
processing means for estimating, based on a determined location of a terminal to be admitted in a cellular network, a load-dependent directional transmission parameter of a directional antenna, which results from an admission of a terminal device; and
controlling means for admitting the terminal device when the estimated load-based direction transmission parameter does not exceed a predetermined threshold in any available direction of the directional antenna,
wherein the controlling means is further for selecting one of a finite set of beams for transmission to said terminal device based on said determined location,
wherein said processing means is further for estimating an increase of said load-dependent directional transmission parameter for directions of said finite set of beams based on a coupling matrix defining coupling coefficients between said finite set of beams, and
wherein said processing means is further for estimating pre-computing said coupling matrix using a fixed azimuth spread of said finite set of beams.

28. An apparatus, comprising;
a processor configured to determine a location of a terminal device to be admitted in a cellular network and further configured to estimate a load-dependent directional transmission parameter of a directional antenna, which results from an admission of said terminal device;
a controller configured to admit said terminal device when said directional transmission parameter does not exceed a predetermined threshold in any available direction of said directional antenna,
wherein the controller is further configured to select one of a finite set of beams for transmission to said terminal device based on said determined location,
wherein the controller is further configured to allocate primary and secondary scrambling codes to different beams of said finite set of beams, and
wherein the controller is further configured to allocate a primary scrambling code to a first subset of beams, and further configured to allocate a secondary scrambling code to a second subset of beams.

29. An apparatus according to claim 28, wherein said directional antenna comprises one of an antenna array with a continuous beamforming capability or a finite set of beams.

30. An apparatus according to claim 28, wherein said directional antenna is located in a base station.

31. An apparatus according to claim 28, wherein said processor is located in a base station.

32. An apparatus according to claim 28, wherein said processor is located in a radio network controller.

33. An apparatus, comprising:
processing means for determining a location of a terminal device to be admitted in a cellular network and for estimating a load-dependent directional transmission parameter of a directional antenna, which results from an admission of said terminal device;
controlling means for admitting said terminal device when said directional transmission parameter does not exceed a predetermined threshold in any available direction of said directional antenna,
wherein the controlling means is further for selecting one of a finite set of beams for transmission to said terminal device based on said determined location,
wherein the controlling means is further for allocating primary and secondary scrambling codes to different beams of said finite set of beams, and
wherein the controlling means is further for allocating a primary scrambling code to a first subset of beams, and further configured to allocate a secondary scrambling code to a second subset of beams.

* * * * *